United States Patent [19]

Dischert

[11] Patent Number: 4,599,640
[45] Date of Patent: Jul. 8, 1986

[54] TELEVISION CAMERA WITH MULTIPLEXED A-D CONVERTER

[75] Inventor: Robert A. Dischert, Burlington, N.J.

[73] Assignee: RCA Corporation, Princeton, N.J.

[21] Appl. No.: 635,831

[22] Filed: Jul. 30, 1984

Related U.S. Application Data

[63] Continuation-in-part of Ser. No. 584,861, Feb. 29, 1984, abandoned.

[51] Int. Cl.[4] .............................................. H04N 9/09
[52] U.S. Cl. ........................................ 358/50; 358/41; 358/43
[58] Field of Search ................. 358/41, 43, 44, 29, 358/50, 51, 52, 48

[56] References Cited

U.S. PATENT DOCUMENTS

| | | | |
|---|---|---|---|
| 3,617,626 | 11/1971 | Bluth | 358/311 |
| 3,996,607 | 12/1976 | Heitmann | 358/13 |
| 4,150,397 | 4/1979 | Russell | 358/127 |
| 4,163,247 | 7/1979 | Bock et al. | 358/41 |
| 4,163,248 | 7/1979 | Heitmann | 358/12 |
| 4,167,755 | 9/1979 | Nagumo | 358/213 |
| 4,205,336 | 5/1980 | Nagumo | 358/43 |
| 4,240,103 | 12/1980 | Poetsch et al. | 358/41 |
| 4,246,598 | 1/1981 | Bock et al. | 358/43 |
| 4,326,219 | 4/1982 | Griesshaber | 358/163 |
| 4,352,123 | 9/1982 | Flamm | 358/23 |
| 4,364,080 | 12/1982 | Vidovic | 358/10 |
| 4,367,457 | 1/1983 | Tadauchi et al. | 340/347 |
| 4,396,938 | 8/1983 | Dischert | 358/21 R |
| 4,400,691 | 8/1983 | Izumi et al. | 340/347 |
| 4,422,094 | 12/1983 | Lewis, Jr. et al. | 358/37 |
| 4,446,487 | 5/1984 | Horikawa | 358/280 |
| 4,470,125 | 9/1984 | Dischert et al. | 364/760 |
| 4,514,760 | 4/1985 | Balaban et al. | 358/143 |

FOREIGN PATENT DOCUMENTS

| | | |
|---|---|---|
| 0109261 | 5/1984 | European Pat. Off. . |
| 50186 | 3/1982 | Japan ................................ 358/29 |
| 36091 | 3/1983 | Japan ................................ 358/50 |
| 1587496 | 4/1981 | United Kingdom . |

OTHER PUBLICATIONS

Graf, R. F., *Modern Dictionary of Electronics*, Howard W. Sams & Co., Inc., Indianapolis, Fifth Edition, 1978, p. 655, "Shaft Position Encoder".

*Analog Devices Data Acquisition Products Catalog*, 1978, pp. 343-344, DAC1106/DAC1108.

*Primary Examiner*—James J. Groody
*Assistant Examiner*—Randall S. Svihla
*Attorney, Agent, or Firm*—Eugene M. Whitacre; Paul J. Rasmussen; William H. Meise

[57] ABSTRACT

A color television camera includes imagers which produce signals representative of various colors of a scene. The signals are multiplexed to an analog-to-digital converter (ADC) for conversion to sequential digital video form for processing by a single-channel digital processor. In order to avoid loss of resolution, and to take full advantage of the speed of operation of the ADC, the imagers are clocked mutually out-of-phase so as to sequentially provide imager signals at a rate related to the multiplexer rate.

11 Claims, 9 Drawing Figures

TELEVISION CAMERA WITH MULTIPLEXED A-D CONVERTER

This is a continuation-in-part of U.S. application Ser. No. 584,861 filed Feb. 29, 1984, now abandoned.

BACKGROUND OF THE INVENTION

This invention relates to a television camera having multiple clocked solid-state imagers for producing a plurality of signal components which are multiplexed to a single analog-to-digital converter which is common to the signal components.

Portable color television cameras are in common use for Electronic Newsgathering (ENG) applications and are becoming commonplace for home use. The cameras currently use analog video signal processing. The synchronizing circuits are currently almost universally composed of binary circuits using signal levels representing ONE and ZERO (i.e., ON, OFF) which are sometimes referred to as digital circuits. It is known to process television video signals by the use of digital circuits representing in combination a large number of possible amplitudes, rather than only two as in the aforementioned synchronizing circuits. For example, different combinations of eight on-off digital signals can represent up to $2^8$ possible amplitudes, thereby representing the video signal by means of stable digital circuits. In addition to being stable, certain types of signal processing can be readily implemented in digital form which are difficult or impossible to implement in analog form, as for example circuits requiring long signal delays without change of signal amplitude.

The first step in generating a video signal by a camera involves the use of imagers for transducing light from a scene to a signal. Modern television cameras use color-splitting prisms and a plurality of solid-state imagers to produce time-quantized analog video signals representing red, green and blue components of the scene being televised. U.S. Pat. No. 4,167,755 (Nagumo) describes a camera with three CCD solid-state image sensors to produce red, blue and green-representative signals under the control of a clock or pulse generator. The video signals produced by the imagers are processed as known by low-noise amplifying or by double-correlated sample-and-hold circuits under the control of the clock generator.

If digital signal processing is desired, the analog-to-digital conversion is performed at a point in the circuit at which the analog signal is amplified to a suitable level. Analog-to-digital converters (ADC's) generally have problems of linearity, range, and offsets.

In order to avoid aliasing, the time-quantization or sampling associated with analog-to-digital conversion must be performed at a rate which is at least twice the highest frequency at the input signal which is to be reproduced. Practical considerations such as finite filter cutoff rates make it desirable to operate the ADC at rates three, four or more times higher than the highest frequency of the input signal. When the input signal is a composite color television signal, in which the color information is modulated onto a subcarrier which is added to the luminance signal at a high frequency (3.58 MHz for NTSC), the ADC may be operated at a rate of 14.3 MHz. At such rates, ADC's have additional problems of high power consumption and concomitant heat generation during operation.

It is known to use a single analog-to-digital converter to perform analog-to-digital conversion for a plurality of channels carrying components of a color television system, as described in U.S. Pat. Nos. 4,150,397 (Russell); 4,163,248 (Heitmann); 4,240,103 (Poetsch); and 4,364,080 (Vidovic). In Russell and in Heitmann, a composite color T.V. signal is decoded into components (In Poetsch, and imagers of a camera generate the components) and the components are time-division multiplexed to an ADC, and further processed. Vidovic describes a digital video analyzer which receives video from an external source, processes it to form video components, and time-division multiplexes the video components to an ADC for further processing. As alluded to by Heitmann, the time-division multiplexing results in information loss. This loss results from the fact that during the interval in which the multiplexer couples the ADC to a particular signal component, the signal components which arrive concurrently with the one being converted are lost. The loss of information necessarily results in loss of resolution.

In order to avoid the loss of resolution due to the inability of a multiplexed ADC to convert signals of channels to which it is not connected, one could couple an ADC to receive a single signal representing the totality of the luminance and chrominance information of the scene as described in U.S. Pat. No. 4,422,094 issued Dec. 20, 1983 to Lewis, Jr., et al. This may be accomplished in the context of a camera, for example, by using a single imager in known fashion with a color-stripe or checkerboard filter to produce a signal which from pixel to pixel alternates the color represented. However, such single-imager cameras have not been successful for high-quality use because of colorimetry problems, and furthermore the resolution of the image produced by such single-imager color cameras tends to be low because of the large distance between the pixels representing a particular color. For example, if the horizontal color pattern is RGBRGB, each green-representative pixel (which is the principal component of luminance) is separated by two intervening pixels.

In order to avoid loss of resolution, three imagers may be used and each color signal channel may be provided with an ADC, as described in U.S. Pat. No. 3,617,626 (Bluth). It might be thought that the required frequency of operation of each ADC could be reduced when one ADC is used for each channel rather than using one ADC for a composite signal, thereby reducing the power-consumption of each. However, the imagers of a color camera normally produce R, G and B-representative signals, which unlike the I (in-phase) and Q (quadrature) color signals are wideband signals (since all three are required to form the wideband luminance signal). Thus, use of three imagers, one for each channel, does not significantly affect the required frequency of operation. Furthermore, the aforementioned nonlinearity and offsets of the ADC's can give rise to colorimetry problems when separate ADC's are used for each channel of a camera. For example, if equal analog input signals representing R, G and B are applied to three ADC's (one for each processing channel), the nonlinearities may result in the generation of unequal R, G and B-representative digital signals. These unequal digital signals will cause colorimetry problems.

The present invention is founded upon the recognition that in the context of a portable television camera the use of digital signal processing is especially advantageous because of the relative stability of digital signal processing under the environmental conditions of cold, heat and shock to which portable cameras are subject. Further, because portable cameras are battery-powered, low power drain is desirable, so a single ADC is desirable even though there may be more than one signal transducer. In a fixed studio camera, digital video signal processing is also advantageous in that it reduces the need for alignment, and use of a single ADC provides a low parts count which is desirable for reliability and cost reasons. The loss of resolution occasioned in the aforementioned prior art by the single ADC as used therein is unacceptable for quality television.

Further, the present inventor recognized that while analog-to-digital converters tend to be limited in speed, solid-state imagers such as charge-transfer imagers are even more limited in speed, and are further limited in resolution. Thus, a camera with multiple CCD imagers, each driving a separate analog-to-digital converter, does not take advantage of the potential speed of each of the analog-to-digital converters, and furthermore has resolution limited by the finite number of light-sensing areas on the imager. Also, the present inventor recognized that solid-state charge-transfer imagers, such as CCD imagers, inherently include a clock-controllable storage function which may be advantageously used with a simple timing control to provide a time delay which simplifies time-division multiplexing.

SUMMARY OF THE INVENTION

In a color television camera a plurality of imagers generate separate signals representative of an image under control of a clock. A time-division multiplexer couples the signals from the imagers to an ADC. In order to prevent loss of resolution, the clock controls the imagers so as to read signal from the imagers when the ADC is available.

DESCRIPTION OF THE INVENTION

Figure 1:
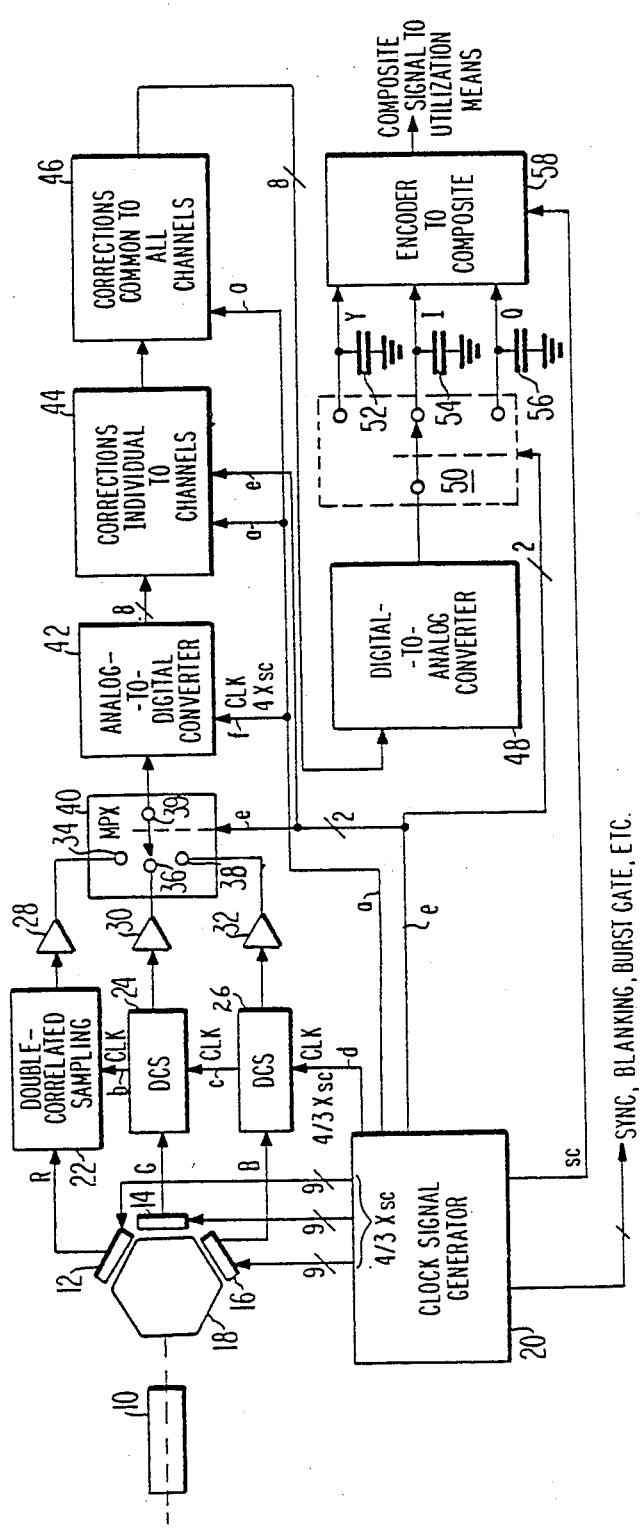
FIGS. 1 and 6 are simplified block diagrams of 3-imager and 2-imager cameras, respectively, according to the invention, together with details of the imager in FIG. 1b.

In the camera illustrated in FIG. 1, a lens 10 focuses an image (not shown) onto red, green and blue-responsive imagers 12, 14, and 16, respectively, by way of a color-splitting prism 18. A clock and synchronizing signal generator 20 controls the clocking of imagers 12, 14 and 16, which may be of the field-transfer type having an "A" light integrating register, a "B" field storage register from which light is blocked, and a "C" line storage register which are controlled by polyphase clock signals. In the embodiment illustrated each of the A, B and C registers is controlled by a three-phase clock signal, for a total of nine control lines for each imager.

Figure 1B:
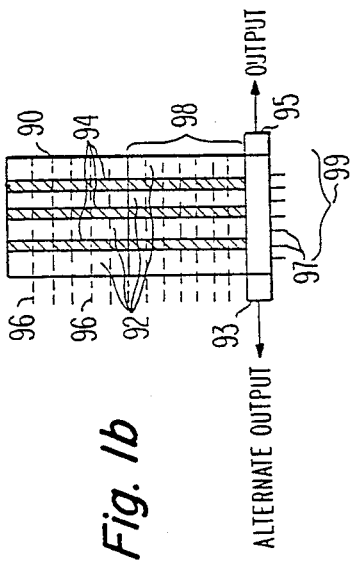

Each solid-state imager may be of the charge-transfer CCD type illustrated in simplified form in FIG. 1b, having an "A" register 90 onto which light is focussed and in the surfaces of which photoelectrons are generated. The photoelectrons are constrained against horizontal movement (i.e., constrained within vertical channels 92) by channel stops 94. Thus, the number of pixels in the horizontal direction is established by the number of channel stops. The channel stops are made small so as to accomodate the maximum possible number of pixels in the horizontal direction, but the current commercial technology produces less than 500 pixels per horizontal line. In the imager of FIG. 1b, vertical motion of accumulated image-representative charge is controlled by polyphase clock voltages applied to control electrodes illustrated as 96, which overlie channels 92. After an integrating period, the clock signals are activated to move the photoelectrons into corresponding portions of a "B" or storage register 98, which is free from light interference. The charge in each packet of each horizontal line is clocked in parallel from B register 98 into C-register 99, from which the pixel representative charge packets are clocked in serial fashion by clock signals applied to clock electrodes 97 to an output 95. In the absence of a clocking signal, the signals in the B and C registers remain stored.

The operating speed of a charge-transfer imager is limited in the vertical direction, because its normal operation moves packets of charge from one potential well or capacitor to another by way of current paths having resistance, and this structure is equivalent to a resistance-capacitance delay line which takes a finite time to discharge one capacitor while charging the next.

The speed of operation in the horizontal direction is limited by the minimum gate size achievable by photolithography. The larger (longer in the charge-transfer direction) the gate is, the smaller are the fringing electric fields in the region between gates, which reduces the forces tending to accelerate an electron located between potential wells to the desired well under control of the clock signals. The speed in the horizontal direction may also be affected by the aforementioned RC time-constant effect.

The outputs of each of imagers 12, 14 and 16 are coupled to double-correlated sampling circuits 22, 24 and 26 as known in the art which are controlled at a clock rate by clock signal generator 20 for receiving packets of electric charge from the imagers and for generating a low-noise video signal therefrom. The clocking rate of double-correlated samplers 22, 24 and 26 corresponds to the rate at which signal samples are clocked from imagers 12, 14 and 16. The signals derived from samplers 22, 24 and 26 are applied to amplifiers 28, 30 and 32 amplification of the signals, as required, and the amplified image-representative signals are then applied to input terminals 34, 36 and 38 of a time-division multiplex circuit 40, the switching rate of which is controlled by clock signal generator 20. The signals selected by time-division multiplexer 40 are applied to analog-to-digital converter (ADC) 42 for conversion of the signal into digital form. The digital image-representative signals are applied from ADC 42 to digital circuits represented by blocks [boxes] entitled "corrections individual to channels" 44 and "corrections common to all channels" 46. The signals processed by the correction circuits 44 and 46 are applied to a digital-to-analog converter (DAC) 48. The sequential-color output signal from digital-to-analog converter 48 is applied to a demultiplexer illustrated as a switch 50 which is similar to, and operated in synchronism with, multiplexer 40 for sequentially coupling each of the components from the signal processing to sample-and-hold circuits, time delays or storage circuits illustrated as capacitors 52, 54 and 56. As illustrated, the color components may be Y, I and Q, with the matrixing from R, G, B to Y, I, Q having been performed by the digital signal processing, or alternatively the components may be R, G, B, in which case an analog matrix following capacitors 52, 54 and 56 may be required. The Y, I, Q signals are applied to a conventional NTSC encoder illustrated as block 58, in which the I and Q signals are individually modulated onto a quadrature-phased subcarrier (SC) and the resulting chrominance signal is summed with the luminance signal to form a conventional composite NTSC (or PAL) signal which is provided to a utilization means. Clock signal generator 20 also generates synchronization (SYNC), blanking and burst gate signals, etc., as well known in the art, for application to various other circuits of the camera for signal processing purposes.

As described above, simultaneously generated analog signals from the imager are time-multiplexed into sequential form, converted to digital form and processed digitally in time-sequential form. The time-sequential digital signals after processing are applied in serial form to a digital-to-analog converter and converted into time-sequential analog signals. Time delays following the demultiplexer return the signals to simultaneous form for further processing. The time sequence of the color signals could be frame-to-frame, field-to-field, line-to-line, or pixel-to-pixel. It is believed that the pixel-rate operation provides the best combination of properties.

In order to reduce the possibility of unwanted beats between the sample rates of the various circuits and the subcarrier, the clock which controls the processing rates and the switching rates should be locked to the color subcarrier signal, SC. For example, it is common to operate digital signal processing at a rate of 4×SC (four times the color subcarrier frequency) which is approximately 14.3 MHz. For this reason, clock signal generator 20 applies 4×SC clock signals to ADC 42, and to other circuits such as correctors 44 and 46 and the like. In order to apply signal to the digital signal processing portion of the camera during each clock pulse, multiplex switches 40 and 50 must be switched at the same rate, namely four times subcarrier. Thus, switch 40 goes through a complete cycle of switching (connects terminal 39 in sequence to terminals 34, 36 and 38) at a frequency of 4/3 times subcarrier (for the case of 3 signals being multiplexed) which for NTSC corresponds to approximately 4.77 MHz. Similarly, imagers 12, 14, and 16 and their double-correlated samplers 22, 24 and 26 are operated (i.e. pixel samples are read) at 4/3 times subcarrier. However, in accordance with an aspect of the invention, in order to avoid loss of resolution by clocking the imagers simultaneously and thereby losing ⅔ of the pixels from each imager for each clock, clock signal generator 20 clocks the imagers mutually 120° out-of-phase. This clocking causes the imagers to be read during the time that the multiplexer makes the ADC available for processing the signal.

At a clock rate of 4/3×SC, and with an active line duration of 53.55 μS, each imager can produce 256 pixels per line. This number of pixels is commensurate with the number of pixels produced by ordinary solid-state imagers. In other words, the signals from three solid-state imagers as currently made when multiplexed together generally match the operating characteristics of readily achievable ADC's.

The reading of pixel-representative signals from each of the three imagers at a relatively low 4.77 MHz rate is commensurate with the speed capabilities of each imager, and the phase-shift (delay of reading) takes advantage of the storage capabilities of the solid-state imager to produce three sequential signals which may be time-division multiplexed in order to produce a signal having a frequency of about 14.3 MHz, commensurate with the speed capability of a video ADC.

In using the storage capability of the imager in this manner, the need is eliminated for auxiliary sample-and-hold circuits as described in the aforementioned Russell patent. The horizontal resolution or number of pixels per horizontal line of each imager is limited to 256 by the sample rate of 4.77 MHz, but this number is equivalent to the effective number of light-sensitive areas in each horizontal line as established by the number of channel stops in each imager. Thus, the described system takes advantage of the limited speed and resolution of each solid-state imager by comparison with the speed of an ADC to produce a camera having the linearity, power and cost advantages of a single ADC but without degrading performance provided by multiple image sensors.

Figure 2:
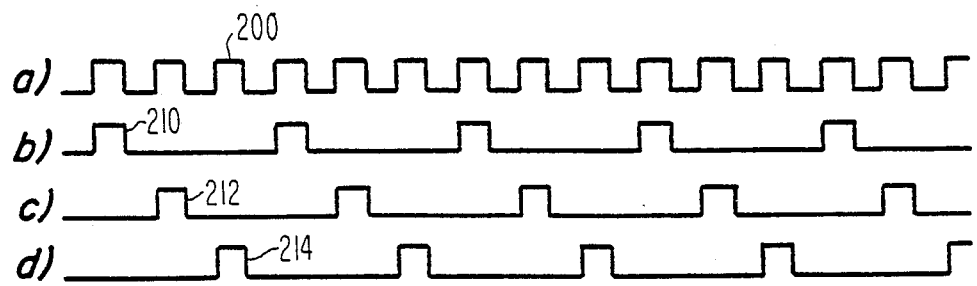
FIG. 2 is an amplitude-time plot representing various clock signals appearing in the arrangement of FIG. 1 during operation.

FIG. 2 illustrates the timing for control of the imagers and of the double-correlated sampling. FIG. 2a illustrates the 4×SC clock signal 200 applied throughout the system, as by conductor "a" of FIG. 1. FIG. 2b illustrates a samping clock waveform 210 which is applied to sampler 22 and is representative of the timing of the clock signals applied to imager 12 to clock the reading of signal from the C register of imager 12. It should be noted that FIGS. 2b, c, and d merely represent the timing, as opposed to the actual clock signal, because the clock signals as applied to the C registers are polyphase signals. FIGS. 2c and 2d represent the timing of the clock signals 212 and 214 applied to samplers 24 and 26, respectively, and represent the timing of the corresponding clock signals applied to imagers 14 and 16, respectively for causing each sampler to operate at the moment that signal is made available from the imager.

Figure 3:
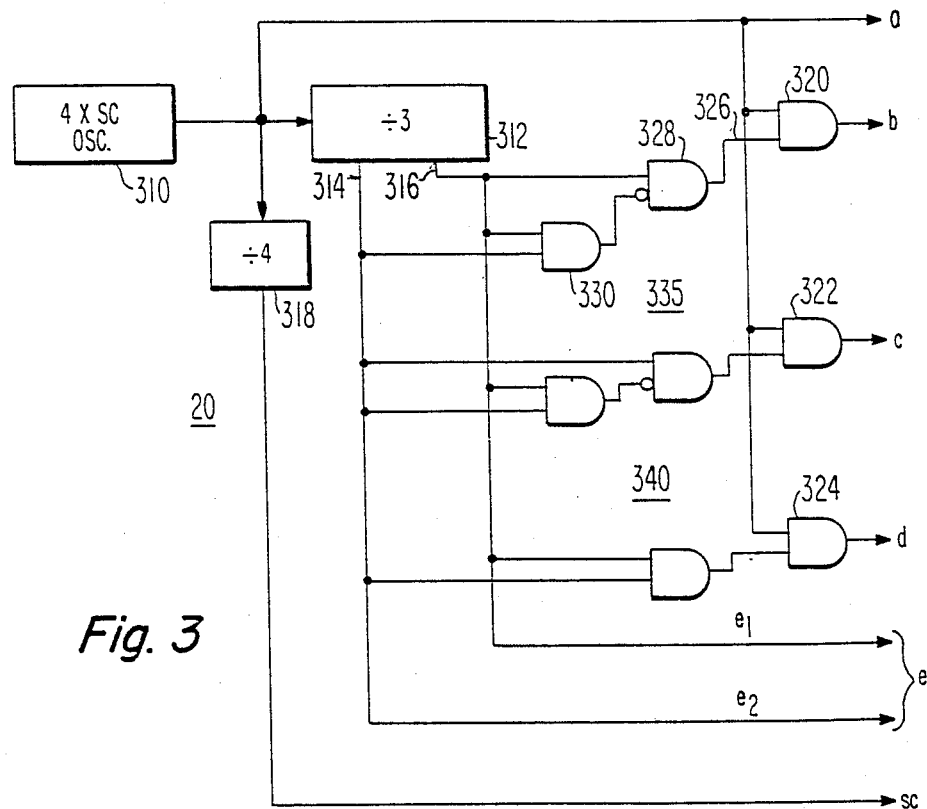
FIG. 3 is a simplified logic diagram of a clock generator for generating signals such as suggested in FIG. 2.

FIG. 3 illustrates in block and partially in schematic diagram form an exemplary embodiment of the clock signal generator 20 of FIG. 1. In FIG. 3, a four times subcarrier (4×SC) oscillator 310 is coupled to a divide-frequency-by-three counter 312 having two output terminals 314, 316 which recurrently assume states of 01; 10; 11 as counting progresses. These states are used to select the imager to be clocked, and to control the state of the multiplex switches and the state of the digital signal processing which is individual to the channels. An output of oscillator 310 is also applied to a divide-by-four counter 318 for producing the subcarrier signal SC for application to encoder 58, and to a conductor a for application to the various digital circuits of FIG. 1 for clocking thereof. The 4×SC clock signals are applied to one input of each of AND gates 320–324 for gating clock signals corresponding to signals 210, 212 and 214 of FIGS. 2b, 2c and 2d, respectively, to conductors b–d, depending upon the state of the logic signals at terminals 314, 316. AND gate 320 is enabled when its input terminal 326 is high, which occurs when AND gate 328 is enabled, which in turn occurs when output terminal 316 is high and when 314 is low. Thus, if terminals 314 and 316 are simultaneously high, AND gate 330 is enabled to produce a high output, which is applied to an inverting input of AND 328 to disable it. For all other conditions at terminals 314 and 316, AND 330 enables AND 328, with the result that a high on 316 and a low on 314 allows AND 320 to gate a pulse 210 (of FIG. 2b) to conductor b. In a similar manner, logic circuits designated generally as 335 and 340 enable AND 322 to gate clock pulses 212 (of FIG. 2c) and enable AND 324 to gate clock pulses 214 (of FIG. 2d) to conductors c and d, respectively. Since the state of the output terminals of counter 312 uniquely identify the imager addressed or clocked, output conductors e1 and e2 on which these logic states appear are coupled throughout the camera to those circuits which must be synchronized on an imager-to-imager basis to identify the signal then being processed, such as multiplexer 40, switch 50 and correction circuit 44. Suitable delays must be used to match the clock signal to the signal actually being processed to compensate for the delays of preceding circuits.

Figure 4:
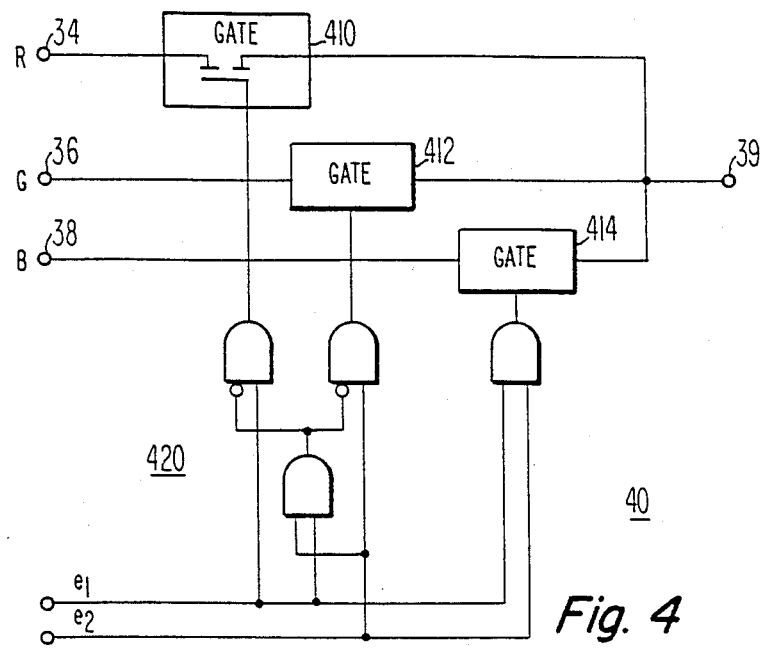
FIG. 4 is a simplified block diagram of a multiplexing circuit for use in the arrangement of FIG. 1.

FIG. 4 illustrates details of multiplex switch 40, which includes first, second and third transmission gates 410, 412 and 414 coupled between input terminals 34, 36 and 38, respectively and output terminal 39 of the multiplex switch. Each of the transmission gates is enabled by a logic signal applied to its control input. A logic arrangement designated generally as 420 and including four AND gates turns on transmission gate 410 when e1 is high and e2 low; turns on transmission gate 412 when e2 is high and e1 low; and turns on transmission gate 414 when both e1 and e2 are high. By simply reversing the through connections to the transmission gates, the arrangement of FIG. 4 can be used for demultiplexer 50.

Figure 5A:
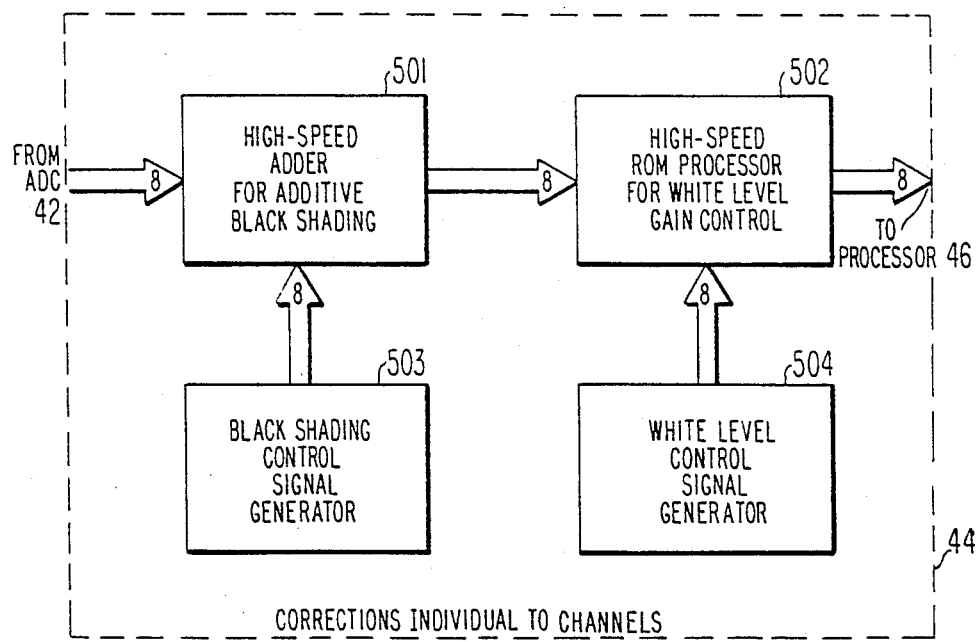
FIGS. 5a–5c include details in block-diagram form of portions of the arrangement of FIG. 1.

FIG. 5a illustrates in block-diagram form a configuration suitable for use in processing the signals which require individual correction for each channel, corresponding to the "corrections individual to channels" block 44 of FIG. 1. The individual corrections are termed "shading" but may include other types of correction including defect correction. In FIG. 5a, the pixel-sequential R, B, G digital signals from ADC 42 are applied to an adder 501 as known in the art for an additive black-level type of control (shading), and the output signal from adder 501 is applied to a high-speed digital ROM processor 502 which is used for a gain-control type of processing for white level control. Processor 502 may be implemented as illustrated in block-diagram form in FIG. 5b which is exemplary of a ROM-based processor (multiplier) 502 which provides a high-speed processing or multiplication of two video signals with a relatively small memory, as described in U.S. patent application Ser. No. 319,460 filed Nov. 9, 1981 in the name of Dischert and Walter, now U.S. Pat. No. 4,470,125 and entitled Multiplier for Digital Video Signals Using Cascade of Signal-Selectable Memories.

Figure 5B:
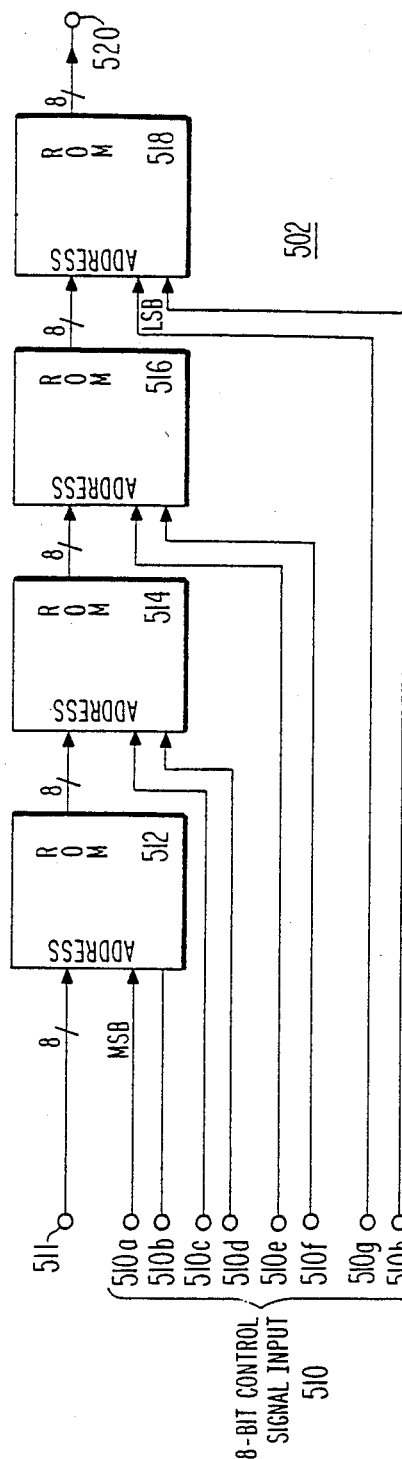

The arrangement 502 of FIG. 5b provides pixel-by-pixel control at video speed which is suitable for channel-dependent corrections in a multichannel camera, which may be for example shading corrections. In order to control shading when the video sequence changes from pixel to pixel in a pattern such as RGBRGB . . . it is necessary to couple to control terminals 510 of the multiplier 502 of FIG. 5b a control signal which represents the appropriate shading signal for each of the pixels. The appropriate shading control signal is provided to multiplier 502 from control signal generator 504, which is described in detail later on with respect to FIG. 5c. The corrected pixel-sequential digital signal from the output of adder 501 is applied to input terminal 511 of multiplier 502 (in FIG. 5b). Multiplier 502 consists of four cascaded ROMS 512, 514, 516 and 518, each ROM having a ten-bit address input. The eight-bit pixel-sequential digital signal provides an eight-bit address to ROM 512 and the two most significant bits (MSB) applied to control terminal 510, i.e., applied to terminals 510a and 510b, provide the remaining two bits of address input to ROMS 512. The eight-bit output signal from which ROM 512, representing the contents of the ROM at the addressed locations, provides eight-address bits to ROM 514. The two next significant bits applied to control terminal 510, i.e., applied to terminals 510c and 510d, provide the remaining two address bits. In a similar manner, ROM 516 receives eight address bits from the output of ROM 514 and two address bits from control terminal 510e and 510f and ROM 518 receives eight address bits from the output of ROM 516 and two address bits from control terminals 510g and 510h. As described in greater detail in the aforenoted U.S. Pat. No. 4,470,125, the eight-bit pixel-corrected digital signal is multiplied by the eight-bit control signal for producing an appropriately attenuated digital signal at output terminal 520.

Figure 5C:
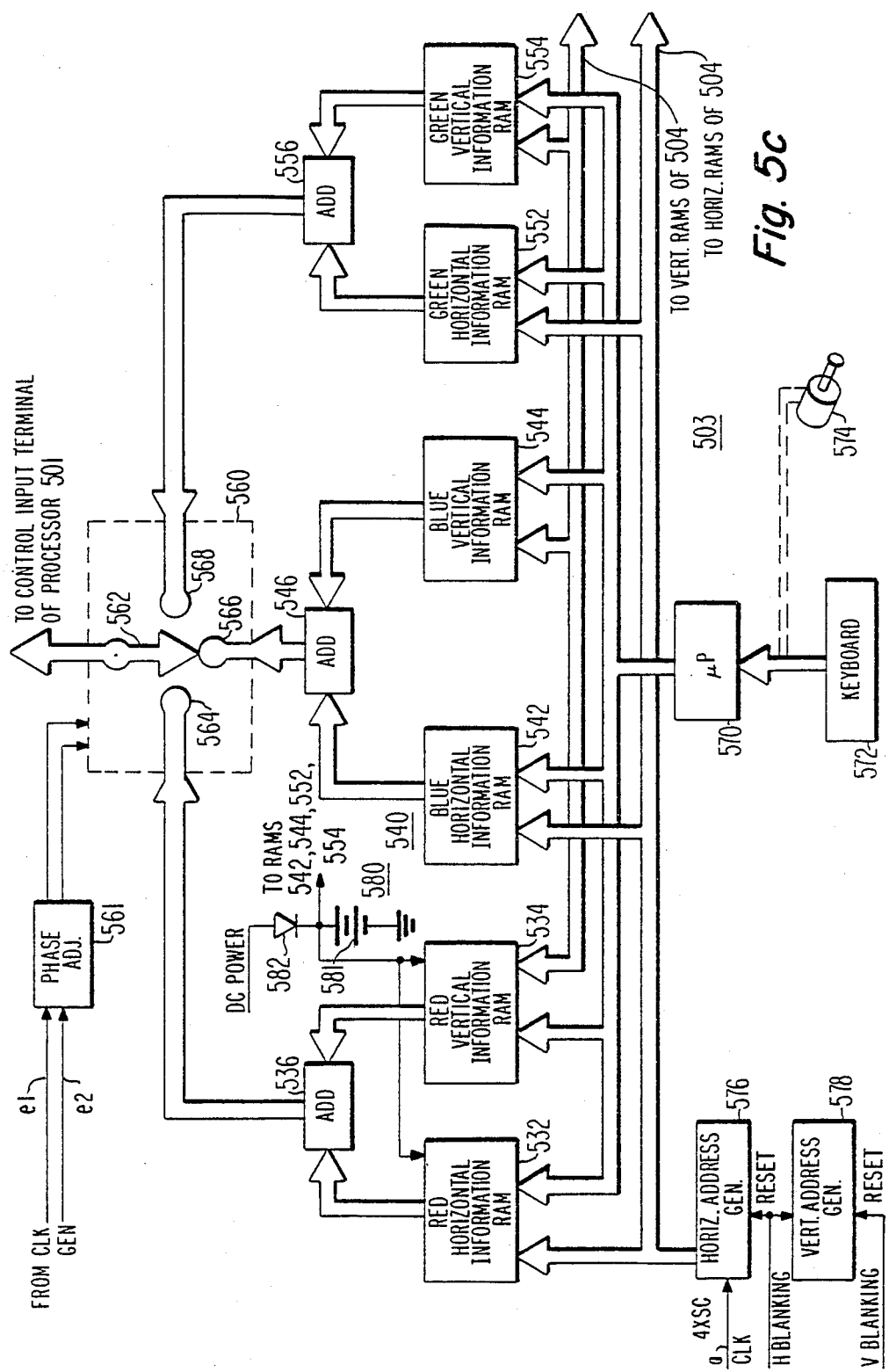

FIG. 5c is a simplified block diagram of details of control signal generator 503 of FIG. 5a suitable for producing a high-speed control signal for processor 501. The structures of control signal generators 503 and 504 are similar, so only generator 503 is discussed. In FIG. 5c, several random-access memories (RAMS) 532, 542, 552 store information relating to horizontal shading. The information is 8-bit information but may have other resolution if desired. The horizontal-information RAMS 532, 542, 552 are addressed by a horizontal address generator 576 which receives 4×SC clock signals over a conductor a and sequentially addresses the memory locations of the horizontal-information RAMS to produce at the outputs of the RAMS information relating to the shading required at various horizontal positions for each of the red, blue and green imagers. Horizontal address generator 576 is reset by a horizontal synchronizing pulse such as a horizontal blanking pulse so as to begin addressing the horizontal RAMS 532, 542 and 552 at the beginning of each horizontal line. Horizontal-information RAMS 532, 542 and 552 need store only a maximum number of words equal to the number of pixels in a horizontal line. In order to reduce the size of the memory and because the resolution of the eye is not so great that small differences in shade can be detected for small horizontal increments, it is possible to arrange horizontal address generator 576 to as to change addresses in horizontal address generator 532, 542 and 552 only every fourth pixel, thereby significantly reducing the amount of memory storage required. Thus, shading correction occurs in a position-quantized fashion over a predetermined number of pixels. Horizontal address generator 576 can also be used to address the horizontal-information RAMS of control signal generator 504 (not shown in FIG. 5c).

Control signal generator 503 also includes vertical-information RAMS 534, 544 and 554 which store red, blue and green shading information. Vertical-information RAMS 534, 544 and 554 are addressed by a vertical address generaator 578 which counts horizontal sync signals such as horizontal blanking signals so as to identify each pixel in the vertical direction, and which is reset by a vertical blanking pulse applied to a reset input terminal. The output of the vertical information RAMS is information relating to the vertical-direction shading for each of the three colors. The vertical and horizontal information for each of the red, blue and green channels is applied to adders 536, 546, 556, respectively, where the signals are added together and applied to a multiplexer 560 (outlined in phantom) in the form of a multi-bit single-pole, 3-throw switch, the common output of which is applied to the control input terminals of processor 501. Multiplexer 560 is controlled by a 2-bit input signal from the clock generator over lines e1 and e2, as described previously in conjunction with FIG. 3. Since there are delays in the signal processing path, a phase adjustment may be necessary and is provided by a phase adjustment block 561.

Vertical and horizontal-information RAMS 532, 534, 542, 544, 552 and 554 are loaded with information during a set-up procedure preceding actual operation of the camera for imaging scenes. The information depends in large part upon the characteristics of the imagers, which are relatively reliable and consistent in their performance as a function of time. Consequently, information stored in RAMS 532, 534, 542, 544, 552 and 554 once memorized is likely to be useful for a very long period of time. Consequently, a keep-alive circuit designated generally as 580 is included, which has a battery 581 for maintaining the RAMS active even when DC power from the main camera battery pack is turned off. When DC power from the main camera battery pack is restored, a diode 582 serves to recharge battery 581. The required information for RAMS 532, 534, 542, 544, 552 and 554 is derived via a microprocessor 570 from a keyboard 572 operated by a camera alignment technician who specifies by means of the keyboard 572 the various addresses and the amount of shading to be used at each address. For some purposes, it may be desirable to use an analog-to-digital converter in the form of a shaft encoder such as 574 for indicating the degree of shading correction to be used at the designated locations.

Details of a digital arrangement for controlling gain, pedestal, gamma and the like are described in U.S. Pat. No. 4,396,938 issued Aug. 2, 1983, in the name of Dischert. Such an arrangement can be used for those corrections which are common to all the channels, i.e., for block 46. As described in the patent, the digital signal is applied alternately as addresses for a pair of RAMS, with the output signal being represented by the contents of the RAM at the address. During those intervals when one RAM is being addressed by the input video signal and read, the other RAM may be loaded with new program values representative of pedestal, gain, and gamma. Such an arrangement can be used for those corrections which are common to all the channels, i.e., for block 46.

Figure 6:
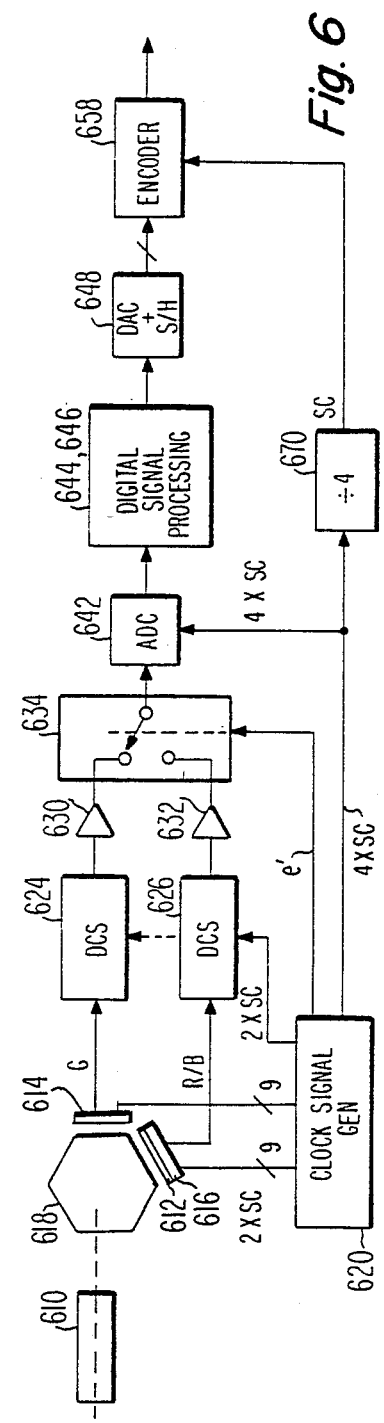

FIG. 6 illustrates another embodiment of the invention in which two imagers are used. In FIG. 6, a lens 610 focuses light from an image (not shown) through a prism illustrated as 618 so that the green component of the light falls on an imager 614 and the remainder of the light is applied by way of a checkerboard or striped color filter 612 to a second imager 616. The output signals from imager 614 are applied to a double-correlated sampling circuit 624 and the output signals from imager 616 are applied to a similar circuit 626. The imager output signals are amplified by amplifiers 630 and 632.

If imagers 614 and 616 were clocked simultaneously, imager 614 would produce for each clock cycle a sample representing the green component of the light from the image. At the same time, imager 616 would alternately produce pixels representing red, blue, red, blue . . . . Clock generator 620 clocks the imagers to produce a time sequence GRGBGRGB . . . , which requires that the imagers be read alternately (that is, with a 180° phase shift rather than 120° as in FIG. 1) and also requires that the multiplexer 634 alternate at the same rate (in response to an alternating selection signal e′) to select the appropriate signal. Such alternating operation should be readily apparent to those skilled in the art in view of the discussion of the clock signal generator of FIG. 1 and is not further described here.

The green signal from amplifier 630 and the alternating red-blue signal from amplifier 632 are placed into time sequential serial form by multiplexer 634 and are operated upon by ADC 642 to produce time-sequential RGBGRGBG . . . signals to be processed by digital signal processors 644 and 646. The minor corrections to the address logic required for the slightly different sequence will be apparent to those skilled in the art. The time-sequential digital information is applied to a DAC and sample-and-hold 648 to produce analog signals which are applied to an encoder 658 to produce a composite signal which is applied to utilization means. The subcarrier upon which encoder 658 modulates the color signal is generated by a frequency divider 670 which divides the 4×SC clock signal. If ADC 642 is clocked at 4×SC (14.3 MHz), each imager is clocked at 2×SC (7.16 MHz). About 383 pixels can be read at 7.16 MHz from an imager during a 53.55 μS active interval.

As described, the arrangement of FIG. 6 uses alternate clocking to alternately read green (which is almost a luminance-representative signal) and red or blue (on a different alternating basis) at low speed from the storage register of the imagers. The multiplexer doubles the rate of signal applied to a single ADC to better utilize the speed capability of the ADC, and to allow a single ADC to be used for processing multiple signals for reducing cost, power dissipation and errors.

The single channel of digital signal processing as described in conjunction with the FIGURES is especially advantageous when used with a single ADC, becsuse it avoids the need for a demultiplexer to distribute the ADC output to a plurality of digital signal processing channels, and because it dramatically reduces the parts count and thereby enhances reliability. Such single-channel digital processing is also very advantageous because it avoids color errors attributable to the differences between DACs; for example, three equal digital signals representative of R, G and B may not result in equal analog output signals, whereas a single multiplexed DAC always produces equal output signals from equal input signals and thereby avoids color errors.

Other embodiments of the invention will be apparent to those skilled in the art. For example, the video words of the described embodiments were represented by 8-bit signals, but more or less bits may be used, and the various channels may use different numbers of bits (i.e., green—8 bits, blue—4 bits, red—6 bits). The actual clock rates are a matter of design choice and the speeds available at the current state of the art. Video switches illustrated for ease of understanding as mechanical switches should be understood to include solid-state elements suited to the actual speed of operation. Delay circuits may include multivibrators, glass or CCD delay lines, transmission lines or the like. While the illustrated embodiments make use of double-correlated sampling for extracting signal from the imagers with low noise, other suitable techniques may be used.

Also, signals such as audio signals may be multiplexed together with the video signals. Such other signals may include signals representing monitoring signals (power-supply voltage, temperature or the like) which may be generated at the pickup device location and which it may be desired to monitor elsewhere.

What is claimed is:

1. Digital signal processing apparatus for a color television camera, comprising:
    a plurality, N, of solid-state image sensing means, each including an array of pixels from which analog image signals are controllably supplied in response to the application of imager clock signals;
    analog-to-digital signal conversion means for receiving at an input terminal thereof said analog image signals and for producing at an output terminal thereof digital signals representative of said analog image signals;
    time-multiplexing means coupled between said input terminal of said analog-to-digital signal conversion means and said plurality of solid-state image sensing means;
    control signal means coupled to said plurality of solid-state image sensing means, to said analog-to-digital signal conversion means and to said time-multiplexing means for
        supplying mutually out-of-phase imager clock signals to respective ones of said solid-state image sensing means for causing analog image signals at a first repetition rate to be supplied by each of said solid-state image sensing means in a time sequential manner,
        enabling said time-multiplexing means to operate at a second repetition rate equal to N times said first repetition rate for sequentially coupling pixel-representative analog image signals from each of said image sensing means to said analog-to-digital signal conversion means for producing a sequence of N interleaved samples occurring at said second repetition rate, and
        enabling said analog-to-digital signal conversion means to operate at said second repetition rate; and
    signal processing means coupled to said output terminal of said analog-to-digital signal conversion means for processing said digital signals obtained therefrom.

2. Apparatus according to claim 1, further comprising encoding means coupled to said signal processing means for encoding a color-representative signal onto a color subcarrier signal and for combining said encoded color subcarrier signal with a luminance-representative signal; and wherein
    N equals three; and
    said first and second repetition rates are derived from the frequency of the color subcarrier signal.

3. Apparatus according to claim 2, wherein:
    said first rate is four-thirds times said color subcarrier signal frequency; and
    said second rate is four times said color subcarrier signal frequency.

4. Apparatus according to claim 1 further comprising encoding means coupled to said signal processing means for encoding a color-representative signal onto a color subcarrier signal and for combining said encoded color subcarrier signal with a luminance-representative signal; and wherein
    N equals two; and
    said first and second repetition rates are derived from the frequency of the color subcarrier signal.

5. Apparatus according to claim 4 wherein:
    said first rate is two times said subcarrier signal frequency; and
    said second rate is four times said subcarrier signal frequency.

6. Apparatus according to claim 1, further comprising:
    signal amplifying means equal in number to N, each of said signal amplifying means being coupled to a respective one of said N image sensing means and comprising a sample-and-hold circuit for sampling said image signal from said image sensing means to form a sampled signal and for holding said sampled signal for a time interval at least as great as the period of said first repetition rate.

7. Apparatus according to claim 6 wherein said control means comprises:
    logic means coupled to said N image sensing means for sequentially enabling said N image sensing means to supply said image signals at said first repetition rate; and
    further logic means coupled to said time-multiplexing means to operate said time-multiplexing means at said second repetition rate for coupling said image signals from each of said image sensing means to said analog-to-digital signal conversion means during said time interval during which each of said sample-and-hold circuits holds its respective sampled signal.

8. Apparatus according to claim 1 further comprising digital-to-analog signal conversion means coupled to said signal processing means for converting said processed digital signals into analog output signals.

9. Digital signal processing apparatus for a color television camera, comprising:
    a plurality, N, of individual and independently operable solid-state image sensing means, each including an array of pixels responsive to a different color component of a light image simultaneously incident on each of said image sensing means pixel arrays and each further including a readout portion from which analog image signals representative of said color component are controllably supplied in response to the application of imager clock signals to said readout portion;
    analog-to-digital signal conversion means for receiving at an input terminal thereof said analog image signals and for producing at an output terminal thereof digital signals representative of said analog image signals;
    time-multiplexing means coupled between said input terminal of said analog-to-digital signal conversion means and said readout portions of said plurality of solid-state image sensing means;
    control signal means coupled to said readout portions of said plurality of solid-state image sensing means, to said analog-to-digital signal conversion means and to said time-multiplexing means for
        supplying mutually out-of-phase imager clock signals to said readout portions of respective ones of said plurality of solid-state image sensing means for causing image signals at a first repetition rate to be supplied by said readout portions of respective ones of said plurality of said solid-state image sensing means in a time sequential manner, enabling said time-multiplexing means to operate at a second repetition rate equal to N times said first repetition rate for sequentially coupling pixel-representative analog image signals from said readout portions of respective ones of said plurality of said solid-state image sensing means to said analog-to-digital signal conversion means for producing a sequence of N interleaved samples occurring at said second repetition rate, and enabling said analog-to-digital signal conversion means to operate at said second repetition rate; and signal processing means coupled to said output terminal of said analog-to-digital signal conversion means for processing said digital signals obtained therefrom.

10. Digital signal processing apparatus for a color television camera comprising:

a plurality, N, of solid-state imagers, each responsive to a different color component of a light image simultaneously incident thereon and each further including a readout portion from which analog image-representative signals representative of the same portion of said incident light image are controllably supplied in response to the application to said readout portion of imager clock signals;

analog-to-digital signal conversion means coupled to said readout portions of solid-state imagers for producing digital signals representative of said analog image-representative signals; and clock signal generator means for supplying a plurality of mutually out-of-phase clock signals to said readout portions of respective ones of said plurality of solid-state imagers for causing said readout portions to supply said analog image-representative signals at a first repetition rate in a time sequential manner, and for causing said analog-to-digital signal conversion means to operate at a second repetition rate equal to N times said first repetition rate for sequentially providing digital signals which are representative of different color components of said same portion of said incident light image.

11. Apparatus according to claim 10 further including:

time-multiplexing means having a plurality of inputs coupled to said readout portions of respective ones of said plurality of solid-state imagers and a common output coupled to said analog-to-digital signal conversion means, responsive to clock signals from said clock signal generator means for operating at said second repetition rate for producing a sequence of N interleaved samples of said analog image-representative signals which are representative of different color components of the same portion of said incident light image.

* * * * *